United States Patent
Okuno

(10) Patent No.: US 9,871,932 B2
(45) Date of Patent: Jan. 16, 2018

(54) IMAGE PROCESSING APPARATUS

(71) Applicant: Brother Kogyo Kabushiki Kaisha, Nagoya-shi, Aichi-ken (JP)

(72) Inventor: Tetsuya Okuno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/203,876

(22) Filed: Jul. 7, 2016

(65) Prior Publication Data

US 2017/0013146 A1    Jan. 12, 2017

(30) Foreign Application Priority Data

Jul. 10, 2015    (JP) .................................. 2015-138982

(51) Int. Cl.
*G06F 3/12* (2006.01)
*H04N 1/00* (2006.01)

(52) U.S. Cl.
CPC ..... *H04N 1/00411* (2013.01); *H04N 1/00474* (2013.01); *H04N 2201/0094* (2013.01)

(58) Field of Classification Search
CPC ....................... H04N 1/00411; H04N 1/00474
USPC ........................................................ 358/1.15
See application file for complete search history.

(56) References Cited

U.S. PATENT DOCUMENTS

| 6,925,538 B2* | 8/2005 | Niwa ......................... G06F 8/60 711/154 |
| 2002/0054326 A1 | 5/2002 | Morita |
| 2008/0068647 A1* | 3/2008 | Isobe ................. H04N 1/00413 358/1.15 |
| 2013/0201509 A1* | 8/2013 | Miyazawa ......... H04N 1/00962 358/1.13 |
| 2014/0366034 A1 | 12/2014 | Fujisawa et al. |
| 2015/0373223 A1* | 12/2015 | Furushige .......... H04N 1/00938 358/1.13 |

FOREIGN PATENT DOCUMENTS

| JP | 2002-084383 A | 3/2002 |
| JP | 2003-296065 A | 10/2003 |
| JP | 2014-239302 A | 12/2014 |

* cited by examiner

*Primary Examiner* — Neil R McLean
(74) *Attorney, Agent, or Firm* — Banner & Witcoff, Ltd.

(57) ABSTRACT

An image processing apparatus includes an operation unit, a communication interface, an image processing engine, a memory storing a plurality of software including first software and second software, and a controller. The controller in response to receiving a first start instruction for executing image processing based on a user's operation, executes association processing associated with the image processing by executing the first software, controls the image processing engine to execute the image processing, loads predetermined data included in the first software by executing the second software, in response to receiving a second start instruction of the image processing from an external apparatus via the communication interface, executes the association processing using the loaded predetermined data by executing the second software and controls the image processing engine to execute the image processing.

7 Claims, 6 Drawing Sheets

(SCAN UPLOAD: CONTINUATION OF FIG. 5)

IMAGE PROCESSING APPARATUS

CROSS-REFERENCE TO RELATED APPLICATION

This application claims priority from Japanese Patent Application No, 2015-138982 filed on Jul. 10, 2015, the entire subject-matter of which is incorporated herein by reference.

TECHNICAL FIELD

The disclosure relates to an image processing apparatus capable of executing image processing.

BACKGROUND

There have been disclosed a multi-function device having a plurality of applications corresponding to scan, print, copy, facsimile functions and the like. For example, an application corresponding to the scan function is configured to execute a variety of processing relating to the scan function, in response to a user's operation on an operation panel.

SUMMARY

One illustrative aspect of the disclosure may provide an image processing apparatus comprising: an operation unit that is to be operated by a user; a communication interface; an image processing engine; a memory storing a plurality of software; a controller configured to, in response to receiving a first start instruction for executing image processing based on a user's operation of the operation unit, execute association processing associated with the image processing by executing first software of the plurality of software; control the image processing engine to execute the image processing; execute load processing of loading predetermined data included in the first software by executing second software of the plurality of software, the predetermined data being for executing the association processing, the second software being different from the first software; in response to receiving a second start instruction of the image processing from an external apparatus via the communication interface, execute the association processing using the loaded predetermined data by executing the second software; and control the image processing engine to execute the image processing.

According thereto, the image processing apparatus can execute the same image processing, in response to the first start instruction that is to be obtained as a result of the user's operation on the operation unit and the second start instruction that is to be obtained from the external apparatus via the communication interface. Specifically, when the first start instruction is obtained, the first control unit executes the association processing by executing the first software, thereby enabling the image processing engine to execute the image processing. Also, the second control unit executes the load processing of loading the predetermined data from the first software, by executing the second software, and when the second start instruction is obtained, the second control unit executes the association processing using the loaded predetermined data, thereby enabling the image processing engine to execute the image processing. According to this configuration, the first control unit that is to be implemented by executing the first software does not have to execute the association processing in accordance with an instruction from the second software. For this reason, when the first software is the existing software, for example, it is not necessary to significantly change the first software.

A control method, a computer program and a computer-readable recording medium configured to store therein the computer program for implementing the image processing apparatus are also novel and useful. A communication system including the image processing apparatus and the external apparatus is also novel and useful.

DETAILED DESCRIPTION

The above-described related art discloses executing scan processing, in response to an instruction that is to be obtained as a result of the user's operation on the operation unit. However, the above-described related art does not disclose executing the scan processing, in response to an instruction that is to be obtained by communication with an external apparatus. For example, a situation is assumed in which an existing image processing apparatus has a scan application for executing the scan processing, in response to an instruction that is to be obtained as a result of the user's operation on the operation unit. An image processing apparatus capable of executing the scan processing, in response to an instruction that is to be obtained by communication with an external apparatus, is developed by improving the existing image processing apparatus. In this case, when an instruction is obtained from the external apparatus, it is considered to develop a new application for supplying the instruction to the scan application. However, when employing such a technique, it is necessary to add a mechanism to the scan application for executing the scan processing in response to an instruction from the new application. Thereby, the existing scan application should be significantly changed.

Therefore, illustrative aspects of the disclosure provide a technology by which it is not necessary to significantly change the existing software so as to implement an image processing apparatus capable of executing the same image processing, in response to an instruction that is to be obtained as a result of a user's operation on an operation unit and an instruction that is to be obtained by communication with an external apparatus.

Figure 1:
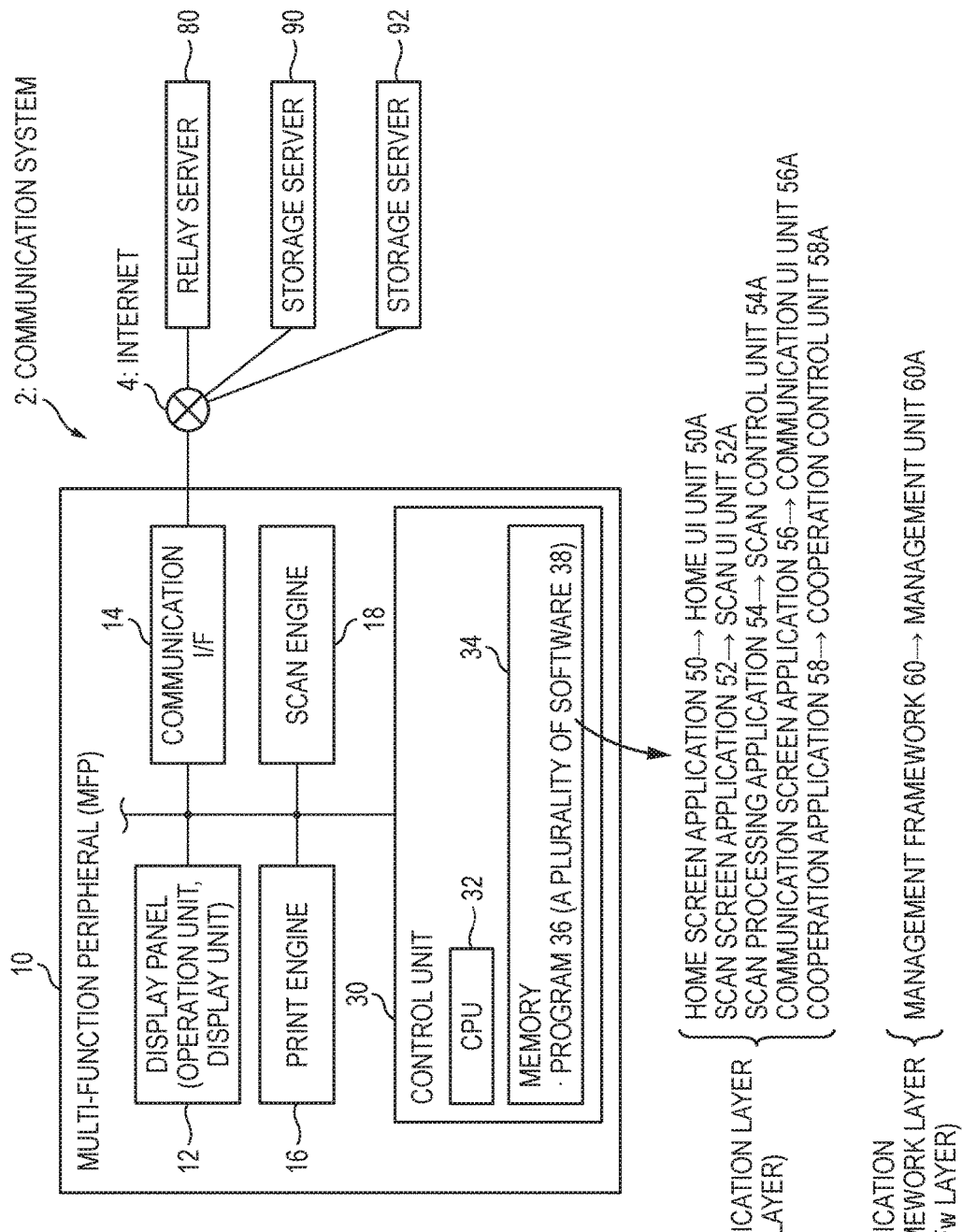
FIG. 1 depicts a configuration of a communication system.

(Configuration of Communication System 2; FIG. 1)

As shown in FIG. 1, a communication system 2 includes a multi-function peripheral 10, a relay server 80 and a plurality of storage servers 90, 92. The respective devices 10, 80, 90, 92 can perform communication with each other through the Internet 4. In the following, the multi-function peripheral 10 is denoted as 'MFP (abbreviation of Multi-Function Peripheral) 10'.

(Configuration of MFP 10)

The MFP 10 is a peripheral device (e.g., a peripheral device of a PC (abbreviation of Personal Computer) (not shown) and the like) capable of executing multi-functions including a print function, a scan function, a copy function and the like. The MFP 10 has a display panel 12, a communication interface (hereinafter, referred to as 'I/F') 14, a print engine 16, a scan engine 18 and a control unit 30. The respective units 12 to 30 are connected to a bus line (a reference numeral thereof is omitted).

The display panel 12 is a display for displaying a variety of information. The display panel 12 is configured to function as a so-called touch panel, and can receive various instructions from a user. That is, the display panel 12 is configured to implement both functions of an operation unit and a display unit. In a modified embodiment, the operation unit and the display unit may be separately configured. The communication I/F 14 is an interface for performing wired or wireless communication, and is connected to the Internet 4 through a LAN (not shown). The print engine 16 has a print mechanism of an inkjet type, a laser type or the like. The scan engine 18 has a scan mechanism such as a CCD (abbreviation of Charge Coupled Device), a CIS (abbreviation of Contact Image Sensor) or the like.

The control unit 30 has a CPU 32 and a memory 34. The CPU 32 is configured to execute a variety of processing, in response to a program 36 stored in the memory 34. The memory 34 is configured by a volatile memory, a non-volatile memory and the like. The program 36 in the memory 34 includes a plurality of software 38. The plurality of software 38 includes applications 50 to 58 belonging to an application layer (hereinafter, referred to as 'App layer') and a management framework 60 belonging to an application framework layer (hereinafter, referred to as 'AppFw layer'), which is a lower layer than the App layer. In the following, the application may also be referred to as 'app'. The App layer is a layer on which a variety of applications 50 to 58 for implementing diverse functions are arranged. The AppFw layer is a layer on which the software (e.g., the management framework 60), which is to be commonly used among the applications 50 to 58, is arranged.

The respective software 50 to 60 is executed by the CPU 32, so that respective units 50A to 60A to be described later are implemented. The home screen application 50 is configured to implement a home UI (abbreviation of User Interface) unit 50A for displaying a so-called home screen. The scan screen application 52 is configured to implement a scan UI unit 52 for displaying a variety of screens relating to scan processing. The scan application 54 is configured to implement a scan control unit 54A for enabling the scan engine 18 to execute the scan processing. The communication screen application 56 is configured to implement a communication UI unit 56A for displaying a variety of screens relating to communication with the relay server 80. The cooperation application 58 is configured to implement a cooperation control unit 58A for executing a variety of processing (for example, communication with the relay server 80) in cooperation with the communication UI unit 56A. Herein, the 'cooperation' means that the respective processing, which is to be implemented by the communication screen application 56 and the cooperation application 58, is executed in one task. In the meantime, the program 36 further includes an application relating to the print processing, an application relating to the copy processing, and the like. However, the descriptions thereof are herein omitted.

The management framework 60 is configured to mainly implement a management unit 60A for relaying communication of instructions and the like among the respective units 50A to 56A. The reason of adopting the configuration where the respective units 50A to 56A perform communication via the management unit 60A, instead of directly performing communication, is described. For example, a situation is assumed in which a first application directly supplies an instruction to each of a second application and a third application. In this case, a developer of the first application should develop the first application in cooperation with developers of the second and third applications. In contrast, in a configuration where the first application indirectly supplies an instruction to each of the second and third applications via a management application, the developer of the first application has only to cooperate with a developer of the management application. Therefore, it is possible to easily divide the development activities of the respective applications. This idea is a design model referred to as a so-called MVC (abbreviation of Model View Controller). Also in the illustrative embodiment, the design model of MVC is adopted, and the direct supply of the instruction and the like among the respective units 50A to 56A, which are to be implemented by the respective applications 50 to 56, is prohibited. For this reason, since it is possible to easily divide the development activities of the respective applications 50 to 56, it is possible to improve the development efficiency of the MFP 10. In a modified embodiment, the management unit 60A may be omitted and the direct supply of an instruction and the like among the respective units 50A to 56A may be permitted.

Also, in the illustrative embodiment, the two applications 52, 54 are configured to implement a variety of processing relating to the scan processing. As compared to a configuration where one application is configured to implement the variety of processing, since it is possible to divide the development activities of the respective applications 52, 54, it is possible to efficiently perform the development activity of the MFP 10. In a modified embodiment, the respective processing that is to be implemented by the two applications 52, 54 may be implemented by one application.

Likewise, in the illustrative embodiment, since it is possible to divide the development activities of the respective applications 56, 58 configured to implement a variety of processing relating to communication, it is possible to efficiently perform the development activity of the MFP 10. In a modified embodiment, the respective processing that is to be implemented by the two applications 56, 58 may be implemented by one application. Particularly, in the illustrative embodiment, since the respective applications 56, 58 are configured to execute the processing in cooperation with each other, it is thought that a configuration where the two applications 56, 58 are incorporated into one application can improve the development efficiency. Further, when the cooperation application 58 is configured as one independent application, it is possible to enable the cooperation application 58 to perform communication with not only the relay server 80 but also the other devices (for example, a PC, a facsimile device, other servers and the like). That is, in the illustrative embodiment, it is intended to improve the development efficiency by intensively collecting the processing relating to a variety of communications into the cooperation application 58 and enabling the cooperation application 58 to perform the processing in cooperation with each of a plurality of screen applications including the communication screen application 56.

(Configurations of Respective Servers 80, 90, 92)

Each of the storage servers 90, 92 is configured to obtain data from outside and to preserve the same therein. For example, the storage server 90 and the like are configured to obtain scan data from the MFP 10 and to preserve the same therein. In the following, an operation where the MFP 10 executes the scan processing to generate scan data and uploads the scan data into the storage server 90 and the like is referred to as 'scan upload.' The relay server 80 is configured to relay the scan upload between the MFP 10 and the storage server 90 and the like.

Figure 2:
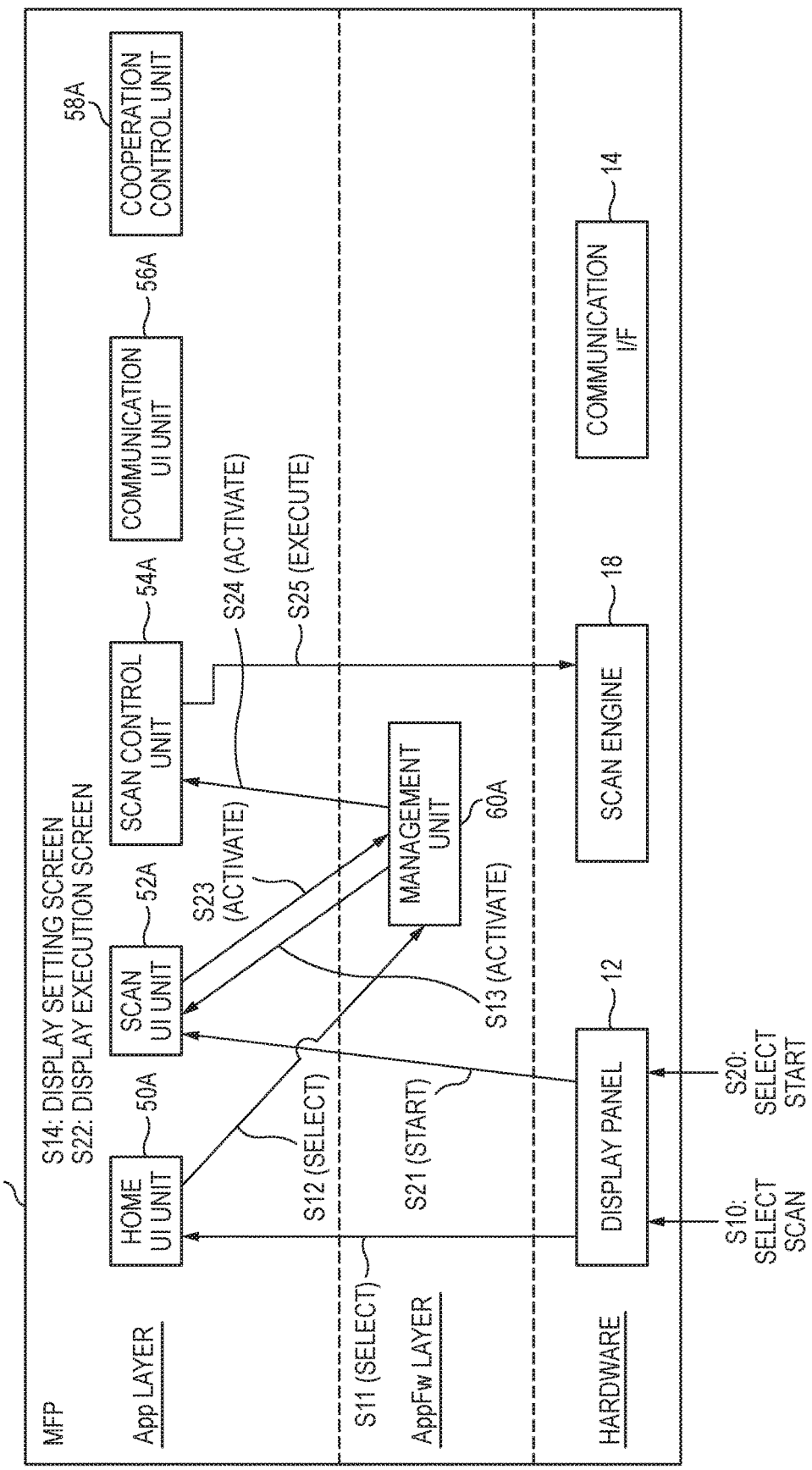
FIG. 2 depicts operations of respective units for implementing a usual scan.

(Usual Scan; FIG. 2)

When a start instruction of the scan processing is obtained as a result of a user's operation on the display panel 12, the MFP 10 can execute the scan processing to generate scan data and store the scan data in the memory 34. In the following, the corresponding operation is referred to as 'usual scan.' The usual scan is described with reference to FIG. 2. FIG. 2 pictorially depicts the respective units 50A to 58A, which are to be implemented by the respective applications 50 to 58 belonging to the App layer, and the management unit 60A that is to be implemented by the management framework 60 belonging to the AppFW layer. Also, FIG. 2 depicts the respective units 12, 14, 18 belonging to the hardware that is a lower layer than the AppFw layer.

At an initial state of FIG. 2, the home UI unit 50A and the management unit 60A are at an activation state, and the other units 52A to 58A are at a non-activation state. Herein, 'activation state and 'non-activation state' mean that a task in accordance with the software is being executed and is not being executed by the CPU 32, respectively. At the initial state, the home UI unit 50A is configured to display a home screen 100 of FIG. 3 on the display panel 12 by using screen data stored beforehand in the memory 34. The home screen 100 is a screen for displaying a state where processing in accordance with any instruction is not being executed, e.g., a state where any instruction is not issued, and includes a plurality of buttons indicative of 'copy', 'scan' and 'relay server.' In S10 of FIG. 2, the display panel 12 receives an operation of selecting 'scan' in the home screen 100. In this case, in S11, the display panel 12 supplies a selection notification, which indicates that 'scan' has been selected, to the home UI unit 50A.

When the selection notification is obtained (S11), the home UI unit 50A supplies the selection notification to the management unit 60A in S12. In this case, in S13, the management unit 60A supplies an activation instruction for activating the scan UI unit 52A to the scan UI unit 52A. As a result, the scan UI unit 52A shifts from the non-activation state to the activation state, and displays a setting screen 110 of FIG. 3 on the display panel 12, instead of the home screen 100, by using the screen data stored beforehand in the memory 34, in S14.

The setting screen 110 is a screen that is provided for the user to select a scan setting, and includes a plurality of setting items indicative of 'duplex scan', 'resolution', and 'number of colors.' The item 'duplex scan' is an item for selecting whether or not to execute a duplex scan. The item 'resolution' is an item for selecting a scan resolution. The item 'number of colors' is an item for selecting a color scan or a monochrome scan. The setting screen 110 further includes two buttons indicative of 'start' and 'cancel.'

In S20 of FIG. 2, the display panel 12 receives an operation of selecting the scan setting in the setting screen 110, and also receives an operation of selecting 'start.' in this case, in S21, the display panel 12 supplies a start instruction of the scan processing to the scan UI unit 52A.

Figure 3:
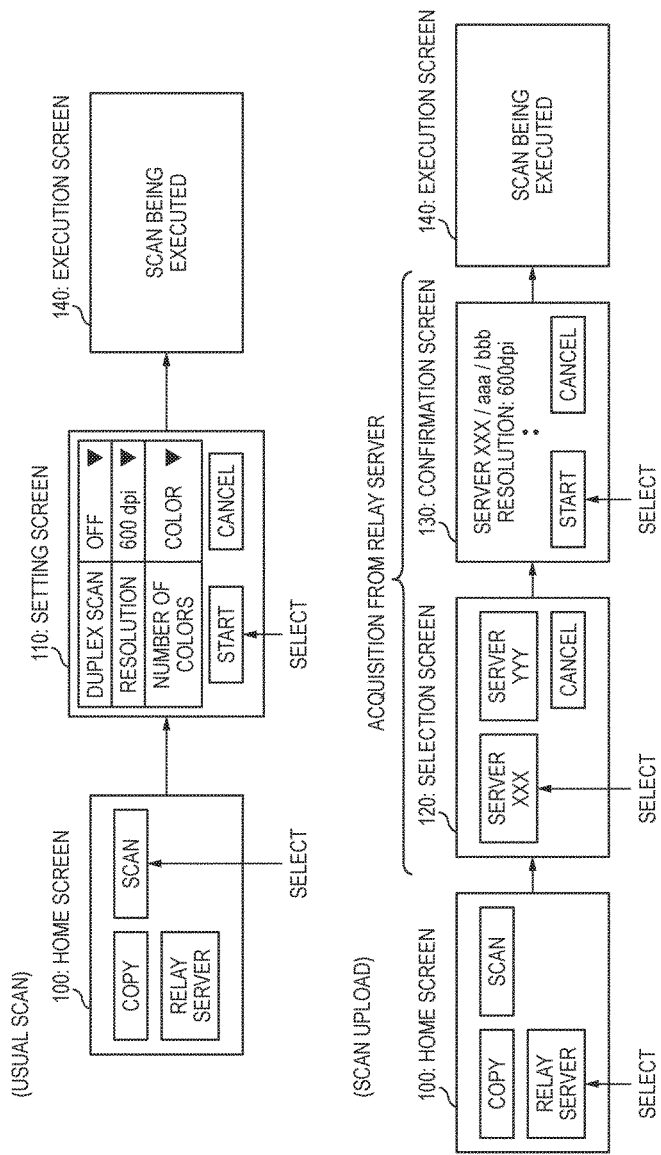
FIG. 3 depicts transition aspects of respective screens.

When the start instruction is obtained (S21), the scan UI unit 52A displays an execution screen 140 of FIG. 3 on the display panel 12, instead of the setting screen 110, by using the screen data stored beforehand in the memory 34, in S22. The execution screen 140 includes a character string indicating that the scan is being executed. In S23 and S24 of FIG. 2, the scan UI unit 52A supplies an activation instruction for activating the scan control unit 54A to the scan control unit 54A via the management unit 60A. As a result, the scan control unit 54A shifts from the non-activation state to the activation state, and supplies an execution instruction of the scan processing to the scan engine 18, in S25. In a modified embodiment, the execution instruction may be indirectly supplied from the scan control unit 54A to the scan engine 18 via another unit.

When the execution instruction is obtained (S25), the scan engine 18 executes the scan processing in accordance with the scan setting selected on the setting screen 110. Thereby, the scan data is generated and stored in the memory 34, so that the usual scan is completed.

Figure 4:
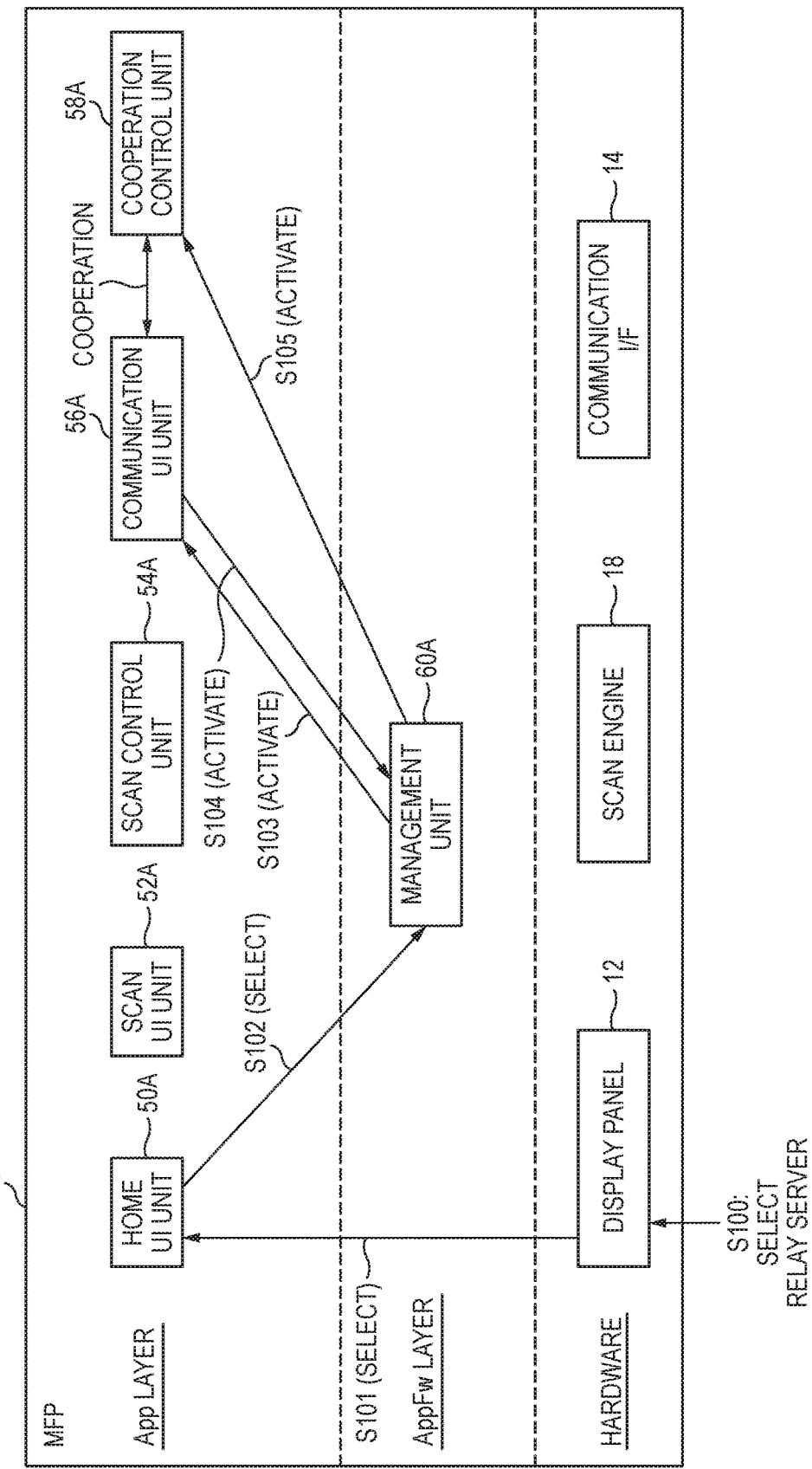
FIG. 4 depicts operations of respective units for implementing a scan upload.

(Scan Upload; FIG. 4)

Subsequently, the scan upload is described with reference to FIG. 4. An initial state of FIG. 4 is the same as the initial state of FIG. 2. In S100 of FIG. 4, the display panel 12 receives an operation of selecting 'relay server' in the home screen 100. In this case, in S101, the display panel 12 supplies a selection notification, which indicates that 'relay server' has been selected, to the home UI unit 50A.

When the selection notification is obtained (S101), the home UI unit 504 supplies the selection notification to the management unit 60A in S102. In this case, in S103, the management unit 604 supplies an activation instruction for activating the communication UI unit 56A to the communication UI unit 56A. As a result, the communication UI unit 56A shifts from the non-activation state to the activation state, and supplies an activation instruction for activating the cooperation control unit 58A to the cooperation control unit 58A via the management unit 60A, in S104 and S105. In this case, the cooperation control unit 58A shifts from the non-activation state to the activation state, so that the communication UI unit 56A and the cooperation control unit 58A cooperate with each other. That is, the respective units 56A, 58A are implemented by one task. In a modified embodiment, the cooperation control unit 584 may be a so-called library. In this case, the communication UI unit 56A may directly use the cooperation control unit 58A without via the management unit 60A.

Figure 5:
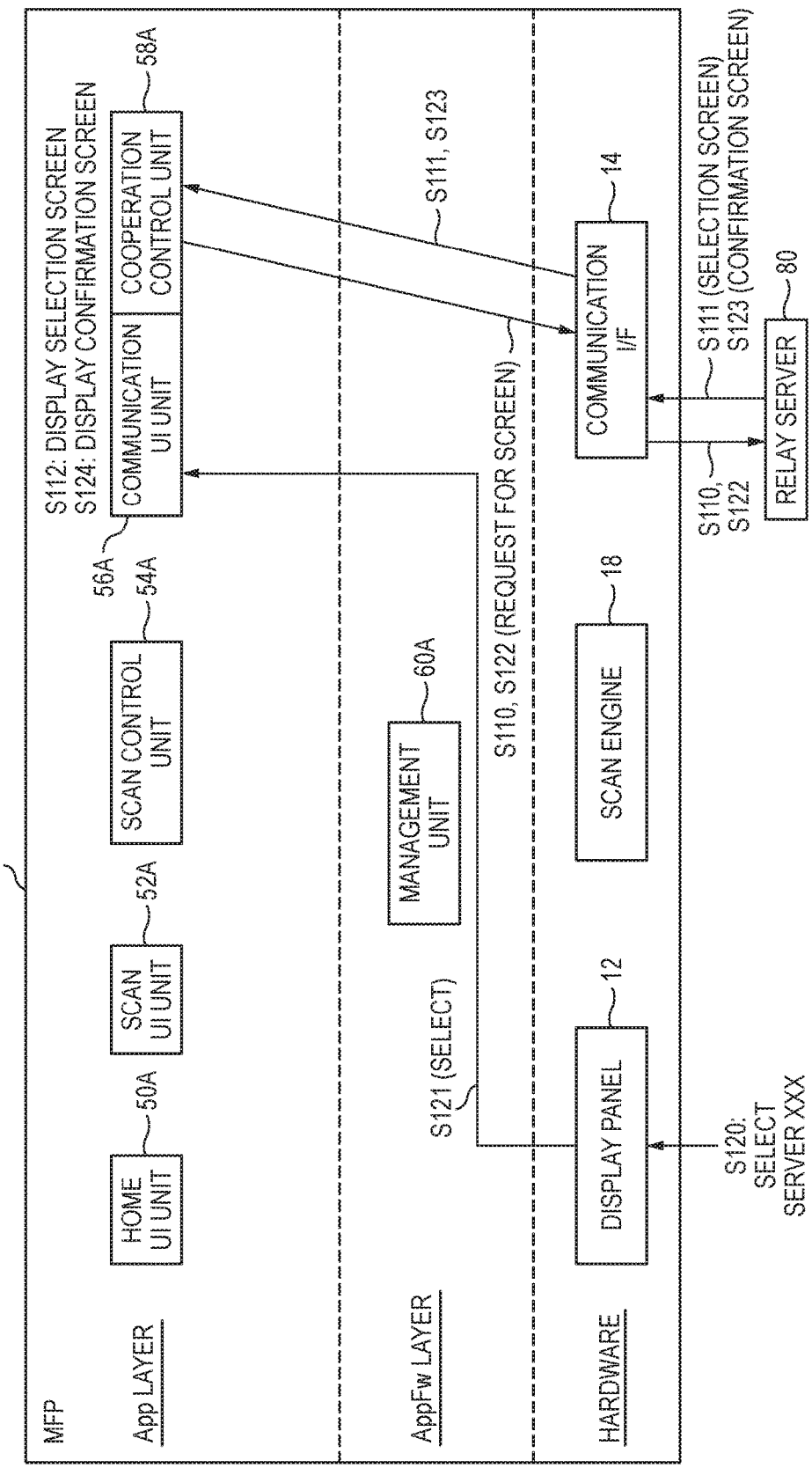
FIG. 5 depicts operations continuing to FIG. 4.

(Continuation of Scan Upload; FIG. 5)

Subsequently, a continuation of operations in FIG. 4 are described with reference to FIG. 5. In FIG. 5, a cooperation state of the respective units 56A, 584 is expressed by a state where the respective units 56A, 58A are in communication with each other. In the following, although the respective units 56A, 584 execute the processing in cooperation with each other, when describing the processing that is to be implemented by the communication screen application 56 and the processing that is to be implemented by the cooperation application 58, the descriptions are made with the communication UI unit 56A and the cooperation control unit 58A as the subjects, respectively.

In S110, the cooperation control unit 58A supplies a screen request to the relay server 80 via the communication I/F 14. As a result, in S111, the cooperation control unit 58A obtains screen data indicative of a selection screen 120 of FIG. 3 from the relay server 80 via the communication I/F 14. When the screen data is obtained by the cooperation control unit 58A, the communication UI unit 56A displays the selection screen 120 on the display panel 12, instead of the home screen 100, by using the screen data, in S112.

The selection screen 120 of FIG. 3 is a screen for selecting an upload destination of the scan data, and includes two buttons indicative of two server names 'server XXX' and 'server YYY' corresponding to the two storage servers 90, 92 and a button indicative of 'cancel.'

In S120 of FIG. 5, the display panel 12 receives an operation of selecting 'server XXX' (e.g., the storage server 90) in the selection screen 120. In this case, in S121, the display panel 12 supplies a selection notification, which indicates that the storage server 90 has been selected, to the communication UI unit 56A. When the selection notification is obtained by the communication UI unit 56A, the cooperation control unit 58A supplies a screen request, which indicates that the storage server 90 has been selected, to the relay server 80 via the communication I/F14, in S122. As a result, in S123, the cooperation control unit 58A obtains screen data indicative of a confirmation screen 130 of FIG. 3 from the relay server 80 via the communication I/F 14. When the screen data is obtained by the cooperation control unit 58A, the communication UI unit 56A displays the confirmation screen 130 on the display panel 12, instead of the selection screen 120, by using the screen data, in S124.

The confirmation screen 130 of FIG. 3 is a screen for user's confirming whether or not to execute the scan upload, and includes a character string 'server XXX/aaa/bbb' indicative of a URL of an upload destination and a character string (for example, 'resolution: 600 dpi') indicative of a scan setting. The confirmation screen 130 further includes two buttons indicative of 'start' and 'cancel.' Herein, the URL of the upload destination is obtained from the storage server 90 by the relay server 80. Also, in the illustrative embodiment, the scan setting in the confirmation screen 130 is determined in advance by the relay server 80. In a modified embodiment, the screen data indicative of the setting screen for selecting the scan setting may be supplied from the relay server 80 to the MFP 10, and the scan sating may be selected by a user of the MFP 10.

Figure 6:
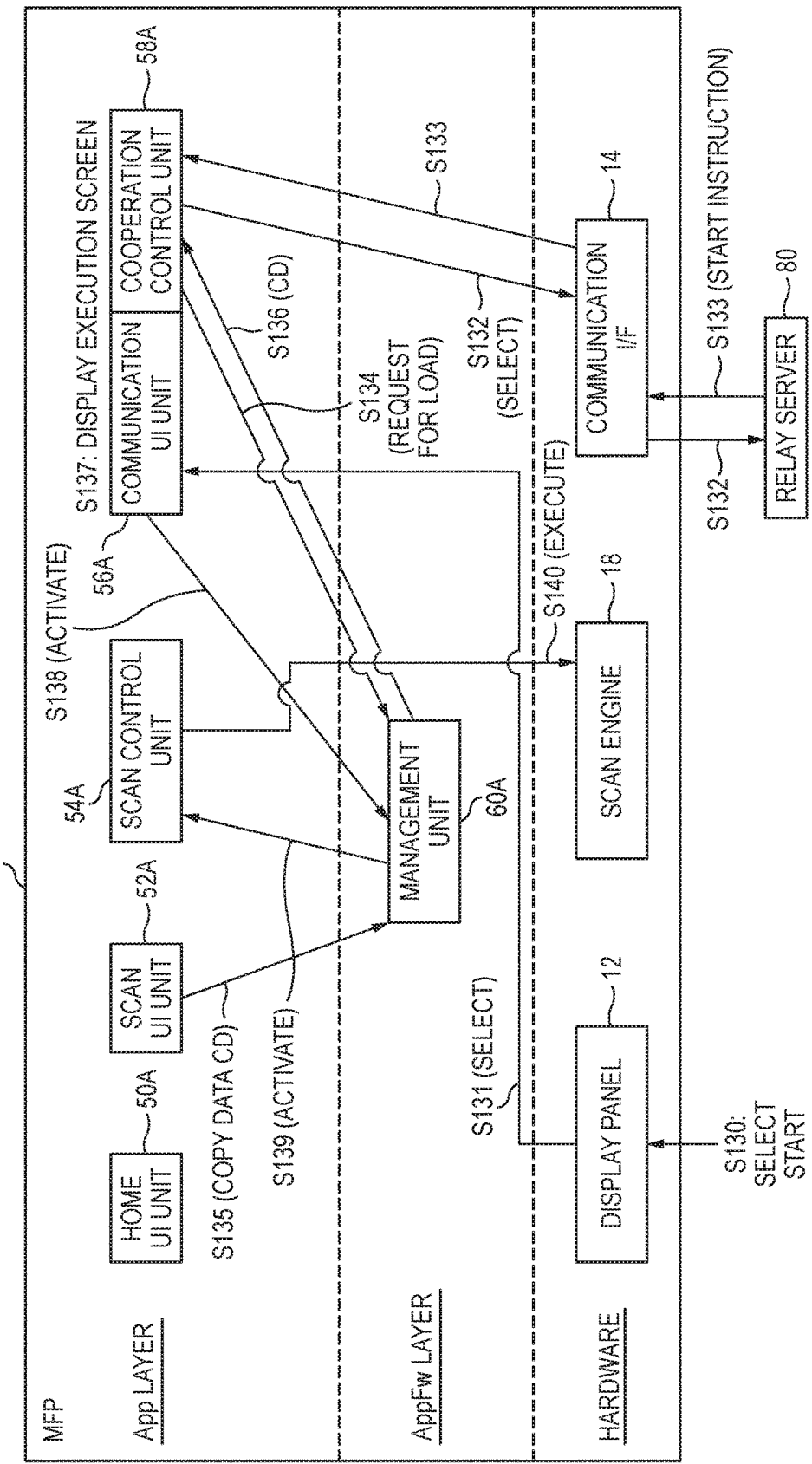
FIG. 6 depicts operations continuing to FIG. 5.

(Continuation of Scan Upload; FIG. 6)

Subsequently, a continuation of operations with reference to FIG. 5 are described with reference to FIG. 6. In S130, the display panel 12 receives an operation of selecting 'start' in the confirmation screen 130. In this case, in S131, the display panel 12 supplies a selection notification, which indicates that 'start' has been selected, to the communication UI unit 56A. When the selection notification is obtained by the communication UI unit 56A, the cooperation control unit 58A supplies the selection notification to the relay server 80 via the communication I/F 14 in S132. As a result, in S133, the cooperation control unit 58A obtains a start instruction of the scan processing from the relay server 80 via the communication I/F 14. The start instruction includes the URL of the upload destination and the scan setting displayed in the confirmation screen 130.

When the start instruction is obtained (S133), the cooperation control unit 58A supplies a load request to the management unit 60A in S134. The load request is a command for requesting the management unit 60A to load (e.g., obtain and read) copy data CD, which is a copy of a part of data of the scan screen application 52. Herein, the part of data includes data for displaying the execution screen 140 of FIG. 3 and does not include data for displaying the setting screen 110. Since all data of the scan screen application 52 is not loaded, unnecessary data is not loaded, so that it is possible to shorten processing time of the load processing. Further, it doesn't matter if the cooperation control unit 584 has a small memory capacity for storing the copy data CD. In a modified embodiment, all data of the scan screen application 52 may be loaded. Also, in the illustrative embodiment, the scan-related application is divided into the scan screen application 52 and the scan processing application 54, and the scan control unit 54A is configured to operate, in response to an instruction from the scan UI unit 52A. For this reason, the cooperation control unit 58A can load the copy data CD, which does not include data configuring the scan processing application 54, as the copy data CD including data configuring the scan screen application 52. In processing thereafter, the unnecessary data (e.g., data configuring the scan processing application 54) is not loaded, so that it is possible to shorten processing time of the load processing. Further, it doesn't matter if the cooperation control unit 58A has a small memory capacity for storing the copy data CD.

In S135, the management unit 604 obtains the copy data CD configuring the scan screen application 52 without shifting the scan UI unit 52A from the non-activation state to the activation state. Then, in S136, the management unit 60A supplies the copy data CD to the cooperation control unit 58A. Thereby, the copy data CD is loaded by the cooperation control unit 58A. As a result, the communication UI unit 56A and the cooperation control unit 58A can execute the respective processing, which is the same as the respective processing (for example, S22 and S23 of FIG. 2) that can be executed by the scan UI unit 52A, by using the loaded copy data CD. In particular, since the cooperation control unit 58A, not the communication UI unit 56A, executes the load processing, it is possible to implement the communication screen application 56 without significantly changing an existing application when improving the existing application to develop the communication screen application 56, for example. In a modified embodiment, the communication UI unit 56A may be configured to execute the load processing. Also, in another modified embodiment, the management unit 60A may obtain in advance the copy data CD from the scan UI unit 52A when the MFP 10 becomes ON, for example. When the load request of S134 is obtained, the management unit 60A may supply the obtained copy data CD to the cooperation control unit 58A.

As described above, the scan UI unit 52A can execute the display processing of the setting screen 110 and the display processing of the execution screen 140 (S14 and S22 of FIG. 2). In the scan upload, since the start instruction of S133 obtained from the relay server 80 includes the scan setting, it is not necessary to display the setting screen 110. For this reason, in S137, the cooperation control unit 58A displays the execution screen 140 by using the loaded copy data CD, instead of the confirmation screen 130, without displaying the setting screen 110 (refer to FIG. 3).

Then, in S138 and S139, the communication UI unit 56A supplies an activation instruction for activating the scan control unit 54A to the scan control unit 54A via the management unit 60A by using the loaded copy data CD. As a result, the scan control unit 54A shifts from the non-activation state to the activation state, and supplies an execution instruction of the scan processing to the scan engine 18, in S140.

When the execution instruction is obtained (S140), the scan engine 18 executes the scan processing in accordance with the scan setting in the start instruction of S133. Thereby, scan data is generated. Although the operations thereafter are not shown, the cooperation control unit 58A outputs the scan data to a destination having the URL of the upload destination in the start instruction of S133 via the communication I/F 14. As a result, the scan data is preserved at a location in the storage server 90 corresponding to the URL, and the scan upload is completed.

The scan screen application 52 for implementing the scan UI unit 52A is an application for implementing the usual scan, which is a basic function of the MFP 10, and is generally prepared by improving an existing scan screen application installed in a conventional product. For example, a first comparative example is assumed in which when the start instruction is obtained from the relay server 80 (S133), the communication UI unit 56A or the cooperation control unit 58A supplies a first activation instruction to the scan UI unit 52A via the management unit 60A. In the first comparative example, the scan UI unit 52A shifts from the non-activation state to the activation state in accordance with the first activation instruction, and displays the execution screen 140 on the display panel 12. Then, the scan UI unit 52A supplies a second activation instruction to the scan control unit 54A via the management unit 60A. As a result, the scan control unit 54A shifts from the non-activation state to the activation state in accordance with the second activation instruction, and supplies the execution instruction to the scan engine 18. In the first comparative example, the scan UI unit 52A should execute the display of the execution screen 140 and the supply of the second activation instruction in accordance with the first activation instruction from the communication UI unit 56A or the cooperation control unit 58A. Therefore, in order to implement the scan screen application 52 of the first comparative example, it is necessary to significantly change the existing scan screen application.

In contrast, according to the MFP 10 of the illustrative embodiment, when the start instruction is obtained from the relay server 80 (S133), the cooperation control unit 58A loads the copy data CD (S134 to S136). Then, the communication UT unit 56A displays the execution screen 140 by using the copy data CD (S137) and supplies the activation instruction to the scan control unit 54A (S138, S139). Therefore, the scan UI unit 52A does not have to execute the processing in accordance with the activation instruction from the communication UI unit 56A or the cooperation control unit 58A. Therefore, it is possible to prepare the scan screen application 52 without significantly changing the existing scan screen application. In other words, the scan screen application 52 is kept as an application for implementing only the basic function of the MFP 10. By doing so, even when a successive device of the MFP 10 should be developed in future, it is possible to use the scan screen application 52 as it is.

Also, a second comparative example is assumed in which the cooperation control unit 58A loads the copy data CD at a timing at which the activation instruction of S105 of FIG. 4 is obtained, e.g., loads the copy data CD before the respective screens 120, 130 are displayed in S112 and S124 of FIG. 5 (and before the start instruction of S133 of FIG. 6 is obtained). In the second comparative example, when 'cancel' in the respective screens 120, 130 is selected, the copy data CD becomes unnecessary, so that the load processing of the copy data CD becomes useless. In contrast, in the illustrative embodiment, the cooperation control unit 58A loads the copy data CD after the display of the respective screens 120, 130 in S112 and S124 of FIG. 5 is over and the start instruction of S133 of FIG. 6 is obtained. Therefore, the communication UI unit 56A and the cooperation control unit 58A can securely use the copy data CD, so that it is possible to suppress the load processing of the copy data CD from being useless. Also, for example, a situation is assumed in which the cooperation control unit 58A should load not only the copy data CD of the scan screen application 52 but also copy data of the other screen applications (for example, the print screen application, the copy screen application and the like). In this case, in the second comparative example, since a situation where a plurality of copy data of a plurality of screen applications is loaded at the same time by the cooperation control unit 58A can occur, it is necessary to secure a memory capacity for storing the plurality of copy data at the same time. In contrast, in the illustrative embodiment, the cooperation control unit 58A loads the copy data CD when it should use the copy data CD. Therefore, when the processing using the copy data CD is completed, the copy data CD is preferably deleted. That is, the cooperation control unit 58A has only to load the copy data from the respective screen applications when it should execute the processing corresponding to each of the plurality of screen applications, and delete the copy data when the processing is over. For this reason, it is sufficient to secure a memory capacity for storing one copy data, and it is not necessary to secure a memory capacity for storing the plurality of copy data at the same time. Meanwhile, in a modified embodiment, the cooperation control unit 58A may execute the load processing before the start instruction of S133 of FIG. 6 is obtained. For example, the cooperation control unit 58A may be configured to execute the load processing at timing at which the activation instruction of S105 of FIG. 4 is obtained, at timing at which the selection notification of S121 of FIG. 5 is obtained or at timing at which the selection notification of S131 of FIG. 6 is obtained.

A combination of the scan screen application 52 and the scan processing application 54 is an example of the 'first software', and the application 52 and the application 54 are examples of the 'first display software' and the 'engine control software', respectively. A combination of the communication screen application 56 and the cooperation application 58 is an example of the 'second software', and the application 56 and the application 58 are examples of the 'second display software' and the 'communication software', respectively. A combination of the scan UI unit 52A and the scan control unit 54A and a combination of the communication UI unit 56A and the cooperation control unit 58A are examples of the 'first control unit' and the 'second control unit', respectively.

The activation instruction of S13 of FIG. 2, the start instruction of S21 and the execution instruction of S25 are examples of the 'first association instruction', the 'first start instruction' and the 'execution instruction', respectively. The activation instruction of S103 of FIG. 4 is an example of the 'second association instruction.' The start instruction of S133 of FIG. 6 is an example of the 'second start instruction.' The setting screen 110, the selection screen 120 and the execution screen 140 of FIG. 3 are examples of the 'first image', the 'third image' and the 'second image', respectively. The copy data CD is an example of the 'predetermined data.'

The processing of S14, S22, S23 and S25 of FIG. 2 is examples of the 'first display processing', the 'second display processing', the 'first activation processing', and the 'supply processing', respectively. The processing of S22 and S23 is examples of the 'association processing,' The processing of S104 of FIG. 4 is an example of the 'second activation processing.' The processing of S110 and S111 of FIG. 5 is examples of the 'obtaining processing.' The processing of S112 is an example of the 'third display processing.' The processing of S134 and S136 of FIG. 6 is examples of the 'load processing.' The processing of S137 and S138 is examples of the 'second display processing' and the 'first activation processing', respectively. The processing of S137 and S138 is examples of the 'association processing.'

While specific embodiments of the invention have been described in detail, these are merely illustrative and are not intended to limit the scope of the appended claims. The technology set forth in the claims, various modifications of the specific examples illustrated above include those embodiments. For example, the following modified embodiments are included.

Modified Embodiment 1

In the illustrative embodiment, the scan processing is an example of the 'image processing.' However, the print processing may be an example of the 'image processing.' For example, the MFP 10 may execute the print processing when a start instruction of the print processing relating to the data in the memory 34 of the MFP 10 or the data in a USB memory mounted to the MFP 10 is obtained as the display panel 12 is operated. In this case, for example, an application associated with the print processing may display an execution screen, which indicates that the print processing is being executed, on the display panel 12. Also, the MFP 10 may execute the print processing when a start instruction including print data is obtained from the external apparatus such as a PC. In this case, the communication UI unit 56A and the cooperation control unit 58A may load copy data configuring the application associated with the print processing, and display the execution screen on the display panel 12 by using the loaded copy data.

Modified Embodiment 2

When 'scan' in the home screen 100 is selected, the MFP 10 may use a default scan setting without enabling the user to select the scan setting. In this case, for example, when the activation instruction of S13 of FIG. 2 is obtained, the scan UI unit 52A may display the execution screen of S22 without displaying the setting screen 110 of S14 and supply the activation instruction of S23 and S24 to the scan control unit 54A. That is, the processing of S14, S20, and S21 may be omitted. In this modified embodiment, the 'first display processing' may be omitted. Also, in this modified embodiment, the activation instruction of S13 is an example of the 'first start instruction.'

Modified Embodiment 3

When the start instruction of S21 of FIG. 2 is obtained, the scan UI unit 52A may not display the execution screen 140 of S22. That is, the processing of S22 may be omitted. In this modified embodiment, the 'second display processing' may be omitted.

Modified Embodiment 4

The variety of information (for example, each server name, URL indicative of the upload destination, the default scan setting and the like) for displaying the respective screens 120, 130 of FIG. 3 may be stored in advance in the memory 34. In this case, the communication UI unit 56A executes the processing of S112 and S124 of FIG. 5 by using the information in the memory 34. That is, the processing of S110, S111, S122 and S123 may be omitted. In this modified embodiment, the 'obtaining processing' may be omitted. In another modified embodiment, when the URL of the upload destination is preset, the processing of S110, S111 and S112 of FIG. 5 may be omitted. In this modified embodiment, the 'third display processing' may be omitted.

Modified Embodiment 5

In the illustrative embodiment, the CPU 32 of the MFP 10 executes the processing in accordance with the program 36, so that the respective processing of FIG. 2 and FIGS. 4 to 6 is implemented. Instead of this configuration, at least one of the respective processing may be implemented by the hardware such as a logical circuit.

Moreover, technical elements described in the specification or drawings exhibit technical utility separately or in all types of combinations of and are not limited to combinations defined in the claims at the time of the filing of the subject application. Additionally, the technologies described in the specification or drawings accomplish a plurality of objects at the same time, and one object achieves technical utility.

What is claimed is:
1. An image processing apparatus comprising:
an operation unit that is to be operated by a user;
a communication interface;
an image processing engine;
a memory storing a plurality of software;
a display; and
a controller configured to:
in response to receiving a first start instruction for executing image processing based on a user's operation of the operation unit, execute association processing associated with the image processing by executing first software of the plurality of software;
control the image processing engine to execute the image processing;
execute load processing of loading predetermined data included in the first software by executing second software of the plurality of software, the predetermined data being for executing the association processing, the second software being different from the first software;
in response to receiving a second start instruction of the image processing from an external apparatus via the communication interface, execute the association processing using the loaded predetermined data by executing the second software; and
control the image processing engine to execute the image processing,
wherein the controller is further configured to:
in response to receiving a first association instruction associated with the image processing based on a user's operation of the operation unit, execute first display processing of displaying a first image associated with the image processing on the display by executing the first software; and
in response to receiving the first start instruction based on a user's operation of the operation unit at a state where the first image is displayed on the display, execute second display processing of displaying a second image associated with the image processing on the display by executing the first software, the second display processing being included in the association processing,
wherein in response to receiving the second start instruction from the external apparatus, the controller is configured to execute the second display processing by executing the second software without executing the first display processing, wherein the first software comprises first display software and engine control software, wherein the controller is configured to execute the first display processing and the association processing by executing the first display software, wherein the association processing comprises:
   the second display processing; and
   first activation processing of activating the engine control software, wherein the controller is further configured to, in response to the engine control software being activated, execute supply processing of supplying an execution instruction for controlling the image processing engine to execute the image processing by executing the engine control software, and
   wherein the predetermined data comprises first display software data and does not comprise engine control software data.

2. The image processing apparatus according to claim 1, further comprising:
a display,
wherein the controller is further configured to, in response to receiving a second association instruction associated with the image processing based on a user's operation of the operation unit, execute third display processing of displaying a third image associated with the image processing on the display by executing the second software.

3. The image processing apparatus according to claim 2, wherein the second software comprises second display software and communication software, and
wherein the controller is further configured to:
   in response to receiving the second association instruction, execute second activation processing of activating the communication software by executing the second display software;
   in response to the communication software being activated, execute obtaining processing of obtaining image data indicative of the third image from the external apparatus via the communication interface by executing the communication software; and
   in response to receiving the image data from the external apparatus, execute the third display processing by using the obtained image data by executing the second display software.

4. The image processing apparatus according to claim 3, wherein the controller is configured to, in response to receiving the second start instruction from the external apparatus, execute the load processing by executing the communication software.

5. The image processing apparatus according to claim 4, wherein the controller is configured to, in response to receiving the second start instruction from the external apparatus after the third image is displayed on the display, execute the load processing by executing the communication software.

6. The image processing apparatus according to claim 3, wherein the controller is configured to execute the association processing using the loaded predetermined data by executing the second display software.

7. A non-transitory computer-readable medium having a computer program stored thereon and readable by a computer installed in an image processing apparatus, the computer program comprising a plurality of software comprising first software and second software, wherein in response to receiving a first start instruction for executing image processing based on a user's operation of an operation unit of the image processing apparatus, the first software, when executed by the computer, causes the image processing apparatus to execute association processing associated with the image processing and control an image processing engine of the image processing apparatus to execute the image processing, wherein the second software, when executed by the computer, causes the image processing apparatus to:
   execute load processing of loading predetermined data included in the first software, the predetermined data being for executing the association processing, the second software being different from the first software; and
   in response to receiving a second start instruction of the image processing from an external apparatus via a communication interface of the image processing apparatus, execute the association processing using the loaded predetermined data and control the image processing engine to execute the image processing, wherein the first software, when executed by the computer, further causes the image processing apparatus to:
   in response to receiving a first association instruction associated with the image processing based on a user's operation of the operation unit, execute first display processing of displaying a first image associated with the image processing on a display of the image processing apparatus by executing the first software; and
   in response to receiving the first start instruction based on a user's operation of the operation unit at a state where the first image is displayed on the display, execute second display processing of displaying a second image associated with the image processing on the display by executing the first software, the second display processing being included in the association processing, wherein in response to receiving the second start instruction from the external apparatus, the second software, when executed by the computer, causes the image processing apparatus to execute the second display processing by executing the second software without executing the first display processing, wherein the first software comprises first display software and engine control software, wherein the first software, when executed by the computer, causes the image processing apparatus to execute the first display processing and the association processing by executing the first display software, wherein the association processing comprises:
   the second display processing; and
   first activation processing of activating the engine control software, wherein the first software, when executed by the computer, further causes the image processing apparatus to, in response to the engine control software being activated, execute supply processing of supplying an execution instruction for controlling the image processing engine to execute the image processing by executing the engine control software, and wherein the predetermined data comprises first display software data and does not comprise engine control software data.

* * * * *